(12) United States Patent
Song

(10) Patent No.: US 11,249,359 B2
(45) Date of Patent: Feb. 15, 2022

(54) DISPLAY PANEL AND DISPLAY APPARATUS

(71) Applicants: HKC CORPORATION LIMITED, Shenzhen (CN); CHONGQING HKC OPTOELECTRONICS TECHNOLOGY CO., LTD., Chongqing (CN)

(72) Inventor: Zhenli Song, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 488 days.

(21) Appl. No.: 16/313,871

(22) PCT Filed: Oct. 25, 2018

(86) PCT No.: PCT/CN2018/111792
§ 371 (c)(1),
(2) Date: Dec. 27, 2018

(87) PCT Pub. No.: WO2020/062380
PCT Pub. Date: Apr. 2, 2020

(65) Prior Publication Data
US 2021/0232008 A1 Jul. 29, 2021

(30) Foreign Application Priority Data
Sep. 30, 2018 (CN) .......................... 201811160518.6

(51) Int. Cl.
*G02F 1/1362* (2006.01)
*G02F 1/1368* (2006.01)

(52) U.S. Cl.
CPC ...... *G02F 1/136286* (2013.01); *G02F 1/1368* (2013.01); *G02F 1/136259* (2013.01)

(58) Field of Classification Search
CPC ......... G02F 1/136259; G02F 1/136268; G02F 2201/46
See application file for complete search history.

(56) References Cited

U.S. PATENT DOCUMENTS

| 5,173,792 A | 12/1992 | Matsueda |
| 6,628,368 B2* | 9/2003 | Yang .................. G02F 1/13624 349/192 |
| 2004/0188681 A1* | 9/2004 | Lai .................... G02F 1/136259 257/59 |

(Continued)

FOREIGN PATENT DOCUMENTS

| CN | 1527268 A | 9/2004 |
| CN | 101201469 A | 6/2008 |

(Continued)

OTHER PUBLICATIONS

Jinjing Feng, the ISA written comments, May 2019. CN.

*Primary Examiner* — Hoan C Nguyen

(57) ABSTRACT

This application discloses a display panel and a display apparatus. The display panel includes a signal line, a drain electrode layer, and a parallel line. The signal line overlaps the drain electrode layer, the parallel line is connected in parallel to the signal line, and two ends of the parallel line are connected to signal lines of two ends of the overlapping area.

10 Claims, 4 Drawing Sheets

(56) References Cited

U.S. PATENT DOCUMENTS

2009/0262274 A1* 10/2009 Noda .................... G02F 1/1309
    349/54
2011/0109863 A1* 5/2011 Liu ................... G02F 1/136259
    349/143
2016/0349580 A1* 12/2016 Feng ................. G02F 1/133514

FOREIGN PATENT DOCUMENTS

| CN | 101216644 | * | 7/2008 |
| CN | 101299124 A | | 11/2008 |
| CN | 101539701 A | | 9/2009 |
| CN | 101943835 A | | 1/2011 |

* cited by examiner

DISPLAY PANEL AND DISPLAY APPARATUS

This application claims priority to Chinese Patent Application No. CN201811160518.6, filed with the Chinese Patent Office on Sep. 30, 2018, and entitled "DISPLAY PANEL AND DISPLAY APPARATUS", which is incorporated herein by reference in its entirety.

TECHNICAL FIELD

This application relates to the field of display technologies, and more specifically, to a display panel and a display apparatus.

BACKGROUND

Descriptions herein only provide background information related to this application, but do not necessarily constitute the prior art.

Liquid crystal displays have many advantages such as thin body, low power consumption, and no radiation, and are widely applied. Most liquid crystal displays in the market are backlight liquid crystal displays. The liquid crystal display includes a liquid crystal panel and a backlight module. A working principle of the liquid crystal panel is placing liquid crystal molecules in the middle of two glass substrates parallel with each other, and applying a driving voltage to the two glass substrates to control a rotation direction of the liquid crystal molecules, to refract light of the backlight module out to generate a picture.

During panel manufacturing, due to environment or machine device factors, defects of some metal wirings or mutual short circuits of some metals, such as an abnormal short circuit of a metal wiring of a gate and an abnormal short circuit of a metal wiring of a data, frequently occur, causing abnormal sub-pixel display, and consequently causing product yield reduction and waste of costs. An improvement method known by the applicant is to use laser cutting to cut an active switch endpoint of an abnormally displayed sub-pixel, to separate the active switch endpoint from a short-circuit line, so that the sub-pixel forms a dark point. When there are sufficiently few dark points, the product yield can be improved. For a pixel electrode known to the applicant, a drain switch layer is usually integrated with a signal line. When a repair is performed due to an abnormal pixel, an abnormal drain electrode layer is usually disconnected, and consequently a signal on the signal line cannot be normally transmitted.

SUMMARY

An objective of this application is to provide a display panel and a display apparatus for normally transmitting information on a signal line when a pixel electrode becomes abnormal.

To achieve the foregoing objective, this application provides a display panel, wherein the display panel comprises a substrate; the substrate comprises a signal line, a parallel line, an active switch, and a pixel electrode; and the active switch comprises a drain electrode layer, and the drain electrode layer is connected to the pixel electrode; the signal line overlaps the gate electrode layer to form an overlapping area, the parallel line is connected in parallel to the signal line, and two ends of the parallel line are respectively connected to signal lines at two ends of the overlapping area.

Optionally, there is only one parallel line corresponding to the overlapping area.

Optionally, there is a first safe distance between the two ends of the parallel line and the overlapping area, and the first safe distance is at least 4.5 um.

Optionally, the parallel line is parallel with the signal line, there is a second safe distance between the parallel line and the signal line, and the second safe distance is greater than a distance by which a cutting path exceeds the signal line.

Optionally, the parallel line is located on an inner side of the signal line, and the inner side of the signal line is a space in which the active switch is connected to the pixel electrode in the overlapping area.

Optionally, the signal line comprises a main line and a first protruding line; the first protruding line draws close to an outer side of the signal line and is located in the overlapping area, and the first protruding line is connected to the main line, wherein joints are oblique lines, and the main line and the first protruding line are both vertical; and the parallel line comprises a second protruding line, and the second protruding line draws close to the first protruding line, and protrudes from a remaining vertical part of the parallel line.

Optionally, the substrate comprises a gate wiring, the gate wiring is connected to the signal line, and the parallel line is located between two adjacent gate wirings.

Optionally, there is a third safe distance between the parallel line and the pixel electrode, and the third safe distance is at least 4 um.

This application further discloses a display panel, wherein the display panel comprises a substrate; the substrate comprises:

a pixel electrode;

an active switch, comprising a drain electrode layer, wherein the drain electrode layer is connected to the pixel electrode;

a signal line, overlapping the gate electrode layer to form an overlapping area; and a parallel line, located on an inner side of the signal line, wherein the inner side of the signal line is a space in which the active switch is connected to the pixel electrode in the overlapping area; and the parallel line is connected in parallel to the signal line, and two ends of the parallel line are respectively connected to signal lines at two ends of the overlapping area:

the signal line comprises a main line and a first protruding line; and the first protruding line draws close to an outer side of the signal line and is located in the overlapping area, and the first protruding line is connected to the main line, wherein joints are oblique lines, and the main line and the first protruding line are both vertical; and the parallel line comprises a second protruding line, and the second protruding line draws close to the first protruding line, and protrudes from a remaining vertical part of the parallel line.

This application further discloses a display apparatus, and the display apparatus comprises the foregoing display panel.

Usually, when sub-pixel display is abnormal, for example, three endpoints of a switch electrode are abnormally short-circuited, pixel electrode display is abnormal, or a com-electrode short circuit problem occurs, the signal lines at the two ends of the overlapping area may be cut off, and then information on the signal lines may be transmitted to a next row of pixel electrodes by using the parallel line.

BRIEF DESCRIPTION OF DRAWINGS

Accompanying drawings included herein are used for providing understanding of embodiments of this application, and constitute a part of this specification. Implementations of this application are exemplarily described, and are used, together with text descriptions, for explaining a principle of this application. Apparently, the accompanying drawings in the following descriptions are only some embodiments of this application, and persons of ordinary skill in the art may further obtain another accompanying drawing based on these accompanying drawings without creative labor. In the accompanying drawings.

DETAILED DESCRIPTION

Figure 1:
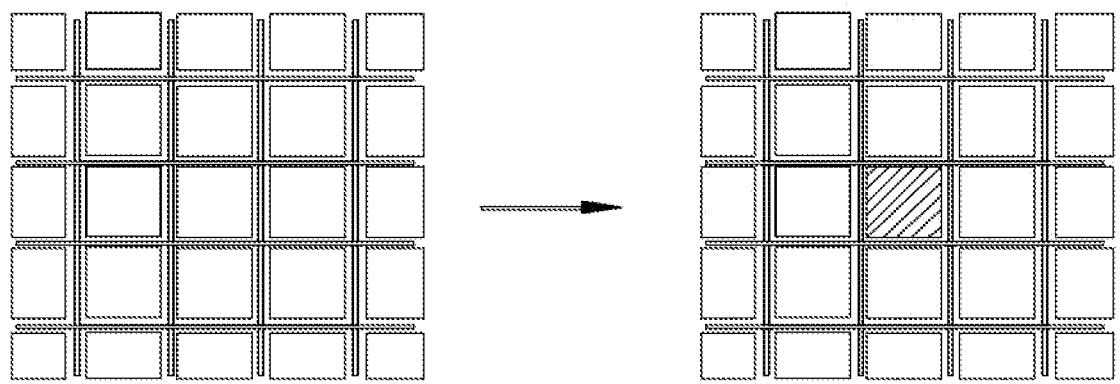
FIG. 1 is a schematic diagram in which a bright point turns into a dark point.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

The following describes this application with reference to the accompanying drawings and optional embodiments.

Figure 2:
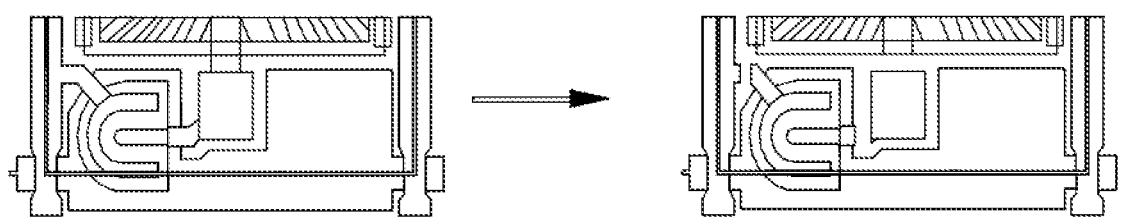
FIG. 2 is a schematic diagram of a local repair of a pixel.
Figure 3:
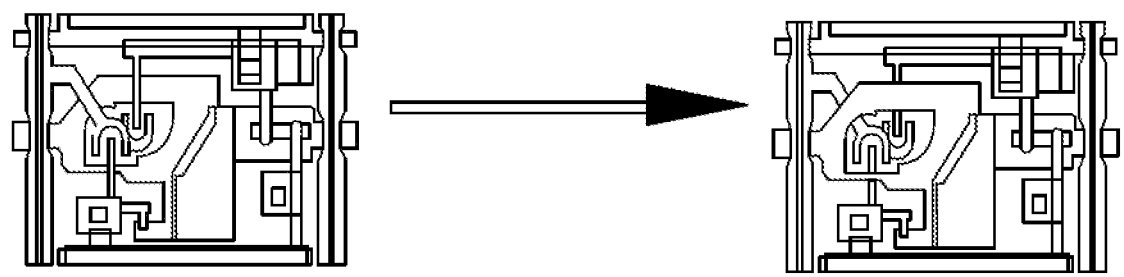
FIG. 3 is a schematic diagram of a repair after a sub-pixel active switch is added.

As shown in FIG. 1 to FIG. 3, during panel manufacturing, due to environment or machine device factors, defects of some metal wirings or mutual short circuits of some metals, such as an abnormal short circuit of a metal wiring of a gate and an abnormal short circuit of a metal wiring of a data, frequently occur, causing abnormal sub-pixel display, and consequently causing product yield reduction and waste of costs. An improvement method known by the applicant is to use laser cutting to cut an active switch endpoint of an abnormally displayed sub-pixel, to separate the active switch endpoint from a short-circuit line, so that the sub-pixel forms a dark point. When there are sufficiently few dark points, the product yield can be improved.

As shown in FIG. 1 and FIG. 2, if a repair method can be performed on the active switch, some more wirings need to be designed for the active switch, to be reserved for use in a laser cutting repair. In this design, a light spot size and a cutting path during laser cutting need to be considered, and therefore more design space is occupied.

As shown in FIG. 3, when design space is relatively small or more active switches need to be placed in limited space, an active switch may be designed to connect to a data line. Although the design space is greatly reduced, a repair rate is reduced. How to increase a repair possibility in this architecture is a main objective of this patent application.

Design used in this application is mainly applied to a pixel for which a drain of an active switch and a data of a signal line are merged. If the active switch becomes abnormal after being manufactured and needs to be repaired, the drain of the abnormal active switch needs to be disconnected.

Figure 4:
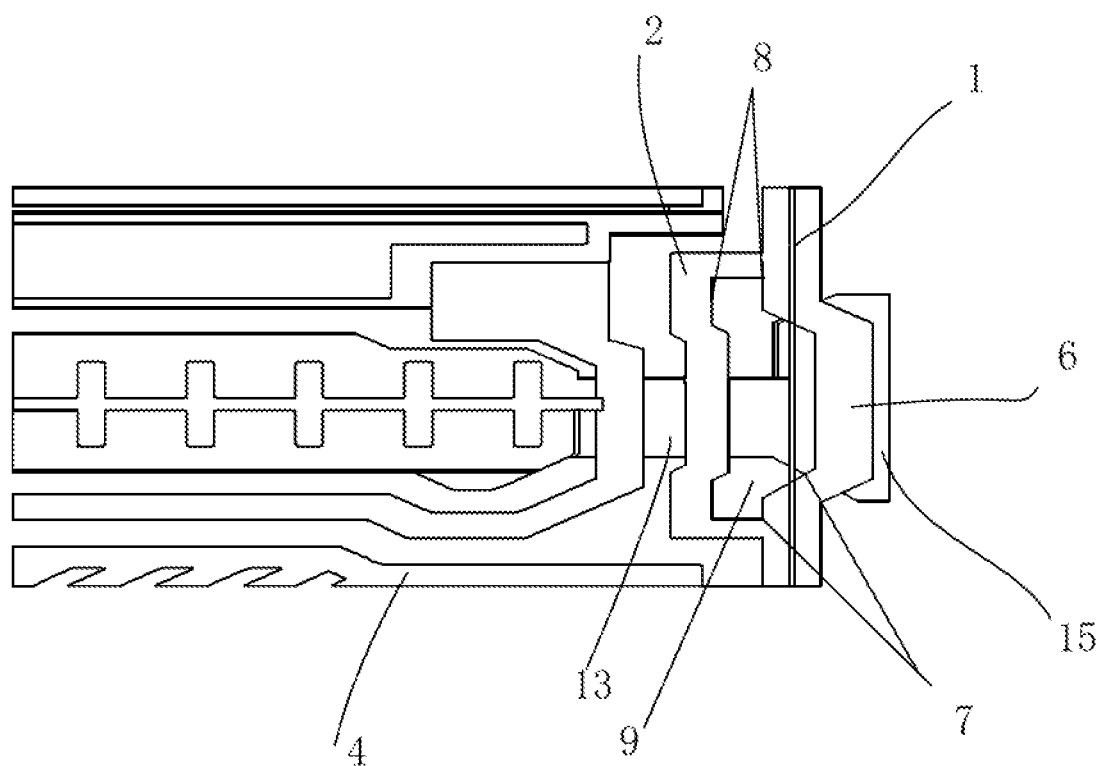
FIG. 4 is a schematic diagram in which a parallel line is added according to an embodiment of this application.
Figure 5:
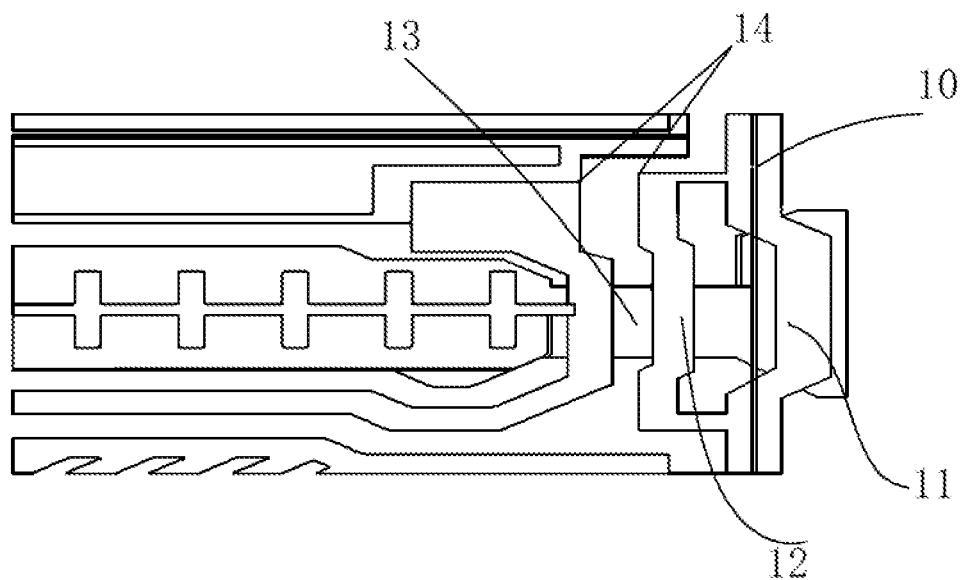
FIG. 5 is a schematic diagram of a repair after a parallel line is added according to an embodiment of this application.
Figure 6:
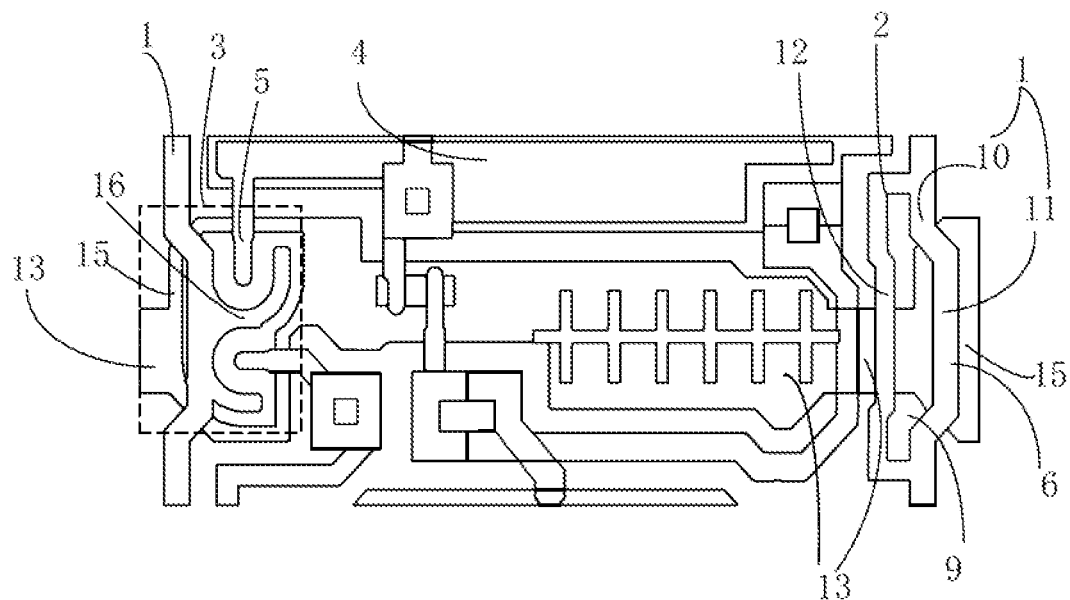
FIG. 6 is a schematic diagram in which an active switch array is used according to an embodiment of this application.

In an embodiment of this application, referring to FIG. 4 to FIG. 6, a display structure is disclosed, and the display structure includes a substrate. The substrate includes a signal line 1, a parallel line 2, an active switch 3, a gate wiring 13 and a pixel electrode 4. The active switch 3 includes a drain electrode layer 5, a gate electrode layer 15 and a source electrode layer 16, and the drain electrode layer 5 is connected to the pixel electrode 4, the gate electrode layer 15 is connected to the gate wiring 13, the source electrode layer 16 is connected to the signal line 1. The signal line 1 overlaps the gate electrode layer 15 to form an overlapping area 6, the parallel line 2 is connected in parallel to the signal line 1, and two ends of the parallel line 2 are respectively connected to signal lines 1 at two ends of the overlapping area 6.

The parallel line 2 is located on an inner side of the signal line 1, and the inner side of the signal line 1 is a space in which the active switch 3 is connected to the pixel electrode 4 in the overlapping area 6; the signal line 1 includes a main line 10 and a first protruding line 11; the first protruding line 11 draws close to an outer side of the signal line 1 and is located in the overlapping area 6, and the first protruding line 11 is connected to the main line 10, where joints are oblique lines, and the main line 10 and the first protruding line 11 are both vertical; and the parallel line 2 includes a second protruding line 12, and the second protruding line 12 draws close to the first protruding line 11, and protrudes from a remaining vertical part of the parallel line 2.

In this solution, usually, when sub-pixel display is abnormal, for example, three endpoints of a switch electrode are abnormally short-circuited, pixel electrode 4 display is abnormal, or a com-electrode short circuit problem occurs, the signal lines 1 at the two ends of the overlapping area 6 may be cut off, and then information on the signal lines 1 may be transmitted to a next row of pixel electrodes 4 by using the parallel line 2.

In another embodiment of this application, referring to FIG. 4 to FIG. 6, a display structure is disclosed, and the display structure includes a substrate. The substrate includes a signal line 1, a parallel line 2, an active switch 3, and a pixel electrode 4. The active switch 3 includes a drain electrode layer 5, and the drain electrode layer 5 is connected to the pixel electrode 4. The signal line 1 overlaps the gate electrode layer 15 to form an overlapping area 6, the parallel line 2 is connected in parallel to the signal line 1, and two ends of the parallel line 2 are respectively connected to signal lines 1 at two ends of the overlapping area 6.

In one or more embodiments, optionally, there is only one parallel line 2 corresponding to the overlapping area 6.

In this solution, more parallel lines 2 indicate that more problems can be dealt with. However, more parallel lines 2 indicate a larger occupied area and more difficult processing, and this is a large problem in itself. In addition, for a display panel, occurrence of abnormal pixel display is after all an incident with a very small probability. Therefore, it does not need to specially add so many insurance measures, and only one parallel line 2 is needed. In this way, space can be reduced, and running of another line component is not affected.

In one or more embodiments there is a first safe distance 7 between the two ends of the parallel line 2 and the overlapping area 6, and the first safe distance 7 is at least 4.5 um.

In this solution, when sub-pixel display is abnormal, the signal lines 1 from the two ends of the overlapping area 6 to the two ends of the parallel line 2 may be cut off. If the two ends of the parallel line 2 are too close to the overlapping area 6, during cutting, the parallel line 2 may be affected or a part other than the two ends of the parallel line 2 may be cut, and consequently an ideal effect is not achieved for the parallel line 2. Therefore, there is the first safe distance 7 between the two ends of the parallel line 2 and the overlapping area 6, and the first safe distance is at least the diameter of a laser light-spot. In this way, the parallel line is not affected during the laser cutting. In this way, the parallel line 2 is not affected during a pixel repair.

In one or more embodiments, the parallel line 2 is parallel with the signal line 1, there is a second safe distance 8 between the parallel line 2 and the signal line 1, and the second safe distance 8 is greater than a distance by which a cutting path exceeds the signal line 1.

In this solution, when the sub-pixel display is abnormal, the signal lines 1 from the two ends of the overlapping area 6 to the two ends of the parallel line 2 may be cut off. If the two ends of the parallel line 2 are too close to the overlapping area 6, during cutting, the parallel line 2 may be cut off. Therefore, a safe distance needs to be maintained between the signal line 1 and the parallel line 2, and the safe distance is greater than the distance by which the cutting path exceeds the signal line 1.

In one or more embodiments, optionally, the parallel line 2 is located on an inner side 9 of the signal line 1, and the inner side 9 of the signal line 1 is a space in which the active switch 3 is connected to the pixel electrode 4 in the overlapping area 6.

In this solution, a switch electrode is on an outer side of the signal line 1. If the parallel line 2 is located on the outer side of the signal line 1, the parallel line 2 overlaps the switch electrode. If the sub-pixel display is abnormal, both the signal line 1 and the parallel line 2 need to be removed from the two ends of the overlapping area 6, and it is not necessary to arrange the parallel line 2 on the outer side of the signal line 1. Therefore, the parallel line 2 should be arranged on the inner side 9 of the signal line 1; otherwise, the significance of the parallel line 2 is lost.

In one or more embodiments, the signal line 1 includes a main line 10 and a first protruding line 11; the first protruding line 11 draws close to an outer side of the signal line 1 and is located in the overlapping area 6, and the first protruding line 11 is connected to the main line 10, where joints are oblique lines, and the main line 10 and the first protruding line 11 are both vertical; and the parallel line 2 includes a second protruding line 12, and the second protruding line 12 draws close to the first protruding line 11, and protrudes from a remaining vertical part of the parallel line 2.

In this solution, the signal line 1 includes the first protruding line 11 protruding to the outer side. Anyway a part of the signal line 1 overlaps a drain electrode layer, and a protruding point formed by using the overlapping part of the signal line 1 does not affect a transmission effect of the signal line 1, and can increase space on the inner side of the signal line 1, thereby facilitating a repair and helping increase utilization of substrate space. A location that is of the parallel line 2 and that corresponds to the first protruding line 11 is also protruded, and space between the parallel line 2 and the pixel electrode 4 is increased, thereby reducing mutual interference, and improving display stability of the pixel electrode 4.

In this solution, each overlapping area 6 has one corresponding parallel line 2. If one parallel line 2 corresponds to a plurality of overlapping areas 6, display of a remaining sub-pixel is abnormal during cutting. In addition, the parallel line 2 is arranged between the two adjacent gate wirings 13. In this way, the parallel line 2 overlapping the gate wirings 13 and consequently signal transmission being affected can be prevented.

In one or more embodiments, optionally, there is a third safe distance 14 between the parallel line 2 and the pixel electrode 4, and the third safe distance 14 is at least 4 um.

In this solution, metal wires affect each other if the metal lines are excessively close to each other during work, causing a short circuit, and abnormal display occurs when the parallel line 2 is excessively close to the pixel electrode 4. Therefore, the parallel line 2 should not be excessively close to the pixel electrode 4, and there is the third safe distance 14, that is, a distance by which two metal wires do not affect each other during work, so that mutual impact can be prevented.

Figure 7:
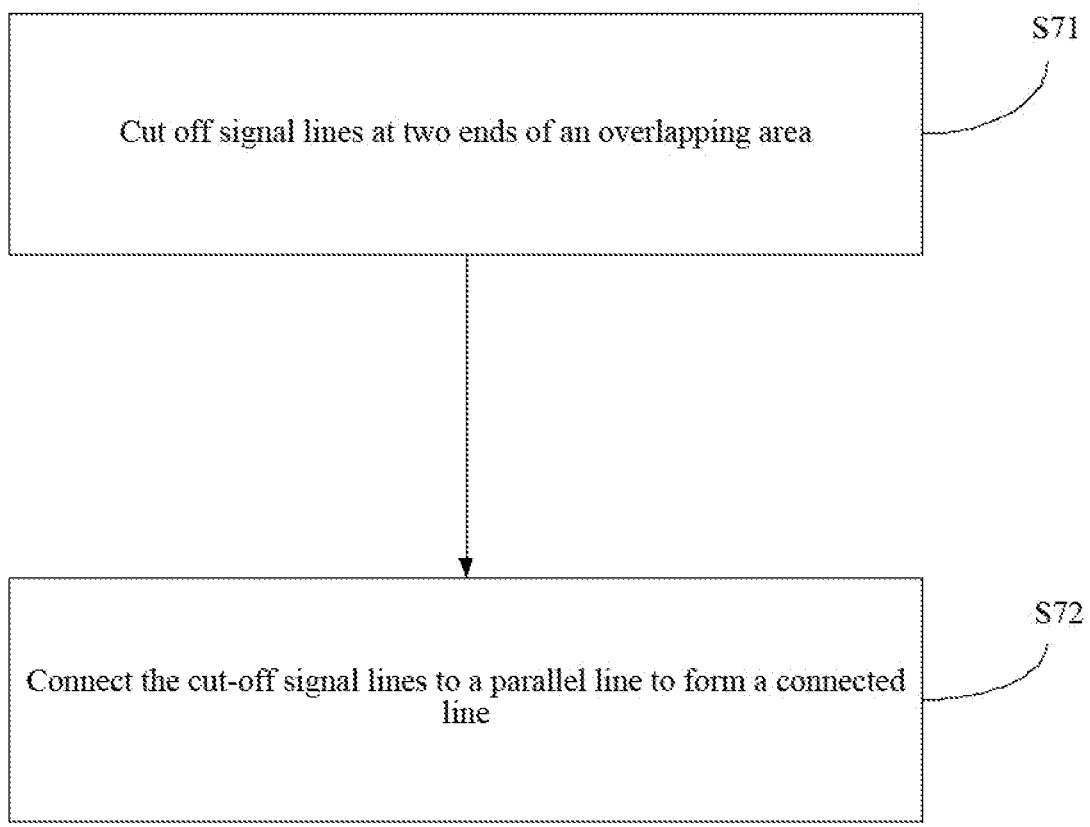
FIG. 7 is a schematic diagram of a process of repairing an active switch array according to an embodiment of this application.

In one or more embodiments, optionally, referring to FIG. 7, a method for repairing the foregoing display panel is disclosed. The repair method is:

S71: Cut off the signal lines 1 at the two ends of the overlapping area 6.

S72: Connect the cut-off signal lines 1 to the parallel line 2 to form a connected line.

In another embodiment of this application, this application discloses a display apparatus. The display apparatus includes the foregoing display panel.

The panel of this application may be a twisted nematic (TN) panel, an in-plane switching (IPS) panel, or a vertical alignment (VA) panel, and may certainly be any other suitable type of panel.

The foregoing contents are detailed descriptions of this application in conjunction with specific embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, wherein the display panel comprises a substrate;
    the substrate comprises a signal line, a parallel line, an active switch, a gate wiring and a pixel electrode; and
    the active switch comprises a drain electrode layer, a gate electrode layer and a source electrode layer, and the drain electrode layer is connected to the pixel electrode, the gate electrode layer is connected to the gate wiring, the source electrode layer is connected to the signal line;
    the signal line overlaps the gate electrode layer to form an overlapping area, the parallel line is connected in parallel to the signal line, and two ends of the parallel line are respectively connected to signal lines at two ends of the overlapping area;
    wherein the parallel line is located on an inner side of the signal line, and the inner side of the signal line is a space in which the active switch is connected to the pixel electrode in the overlapping area;
    wherein the signal line comprises a main line and a first protruding line;
    the first protruding line draws close to an outer side of the signal line and is located in the overlapping area, and the first protruding line is connected to the main line, wherein joints are oblique lines, and the main line and the first protruding line are both vertical; and
    the parallel line comprises a second protruding line, and the second protruding line draws close to the first protruding line, and protrudes from a remaining vertical part of the parallel line.

2. The display panel according to claim 1, wherein there is only one parallel line corresponding to the overlapping area.

3. The display panel according to claim 1, wherein there is a first safe distance between the two ends of the parallel line and the overlapping area, and the first safe distance is at least 4.5 um.

4. The display panel according to claim 1, wherein the parallel line is parallel with the signal line, there is a second safe distance between the parallel line and the signal line, and the second safe distance is greater than a distance by which a cutting path exceeds the signal line.

5. The display panel according to claim 1, wherein there is a third safe distance between the parallel line and the pixel electrode, and the third safe distance is at least 4 um.

6. A display apparatus, comprising a display panel, wherein the display panel comprises a substrate;
    the substrate comprises a signal line, a parallel line, an active switch, a gate wiring and a pixel electrode;
    the active switch comprises a drain electrode layer, a gate electrode layer and a source electrode layer, and the drain electrode layer is connected to the pixel electrode, the gate electrode layer is connected to the gate wiring, the source electrode layer is connected to the signal line;
    the signal line overlaps the gate electrode layer to form an overlapping area, the parallel line is connected in parallel to the signal line, and two ends of the parallel line are respectively connected to signal lines at two ends of the overlapping area;
    wherein the parallel line is located on an inner side of the signal line, and the inner side of the signal line is a space in which the active switch is connected to the pixel electrode in the overlapping area;
    wherein the signal line comprises a main line and a first protruding line;
    the first protruding line draws close to an outer side of the signal line and is located in the overlapping area, and the first protruding line is connected to the main line, wherein joints are oblique lines, and the main line and the first protruding line are both vertical; and
    the parallel line comprises a second protruding line, and the second protruding line draws close to the first protruding line, and protrudes from a remaining vertical part of the parallel line.

7. The display apparatus according to claim 6, wherein there is only one parallel line corresponding to the overlapping area.

8. The display apparatus according to claim 6, wherein there is a first safe distance between the two ends of the parallel line and the overlapping area, and the first safe distance is at least 4.5 um.

9. The display apparatus according to claim 6, wherein the parallel line is parallel with the signal line, there is a second safe distance between the parallel line and the signal line, and the second safe distance is greater than a distance by which a cutting path exceeds the signal line.

10. The display apparatus according to claim 6, wherein there is a third safe distance between the parallel line and the pixel electrode, and the third safe distance is at least 4 um.

* * * * *